United States Patent
Lee et al.

(10) Patent No.: US 7,912,372 B2
(45) Date of Patent: Mar. 22, 2011

(54) OPTICAL ACCESS NETWORK USING WAVELENGTH-LOCKED WDM OPTICAL SOURCE INJECTED BY INCOHERENT LIGHT

(75) Inventors: Chang Hee Lee, Daejeon (KR); Jin Serk Baik, Goyang-si (KR); Keun Youl Park, Busan (KR); Seung Hyun Jang, Jeju-si (KR); Ki Man Choi, Daegu (KR); Hyun Sik Min, Busan (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 449 days.

(21) Appl. No.: 11/166,362

(22) Filed: Jun. 24, 2005

(65) Prior Publication Data
US 2006/0002706 A1    Jan. 5, 2006

Related U.S. Application Data

(63) Continuation of application No. PCT/KR03/02812, filed on Dec. 23, 2003.

(30) Foreign Application Priority Data

Dec. 24, 2002    (KR) .................. 10-2002-0083410

(51) Int. Cl.
*H04J 14/00* (2006.01)
(52) U.S. Cl. .................. 398/72; 398/66; 398/79
(58) Field of Classification Search .............. 398/66–72, 398/75–79
See application file for complete search history.

(56) References Cited

U.S. PATENT DOCUMENTS
4,563,087 A    1/1986   Bourbin et al.
4,912,526 A    3/1990   Iwaoka et al.
(Continued)

FOREIGN PATENT DOCUMENTS
EP    0 060 033 A    9/1982
(Continued)

OTHER PUBLICATIONS
Eun, et al., "Performance Evaluation of MAC Protocol for SuperPON Using WDM," Mar. 7-10, 2000, Optical Fiber Communications Conference 2000, vol. 2, pp. 356-358.
(Continued)

*Primary Examiner* — Dzung D Tran
(74) *Attorney, Agent, or Firm* — Blakely, Sokoloff, Taylor & Zafman LLP (57) ABSTRACT

The present invention relates to a passive optical network, which inexpensively improves the spectral efficiency of an access network and is capable of increasing the number of subscribers per channel by using WDM in combination with Time Division Multiplexing (TDM) or SubCarrier Multiple Access (SCMA) to expand a conventional WDM passive optical network. The passive optical network includes light providing means provided in a central office to provide broadband incoherent light; a multiplexer connected to the central office via an optical fiber to divide the light transmitted from the light providing means according to wavelengths and to multiplex upstream signals; a plurality of splitters to branch divided lights and to combine the upstream optical signals; and a plurality of subscribers connected to the splitters, the subscribers including wavelength-locked Fabry-Perot laser diodes capable of performing direct and analog modulation, and means for directly modulating lights of the Fabry-Perot laser diodes and transmitting modulated lights to the subscribers using time division multiplexing.

20 Claims, 8 Drawing Sheets

U.S. PATENT DOCUMENTS

| | | | |
|---|---|---|---|
| 4,947,134 A | 8/1990 | Olsson | |
| 5,117,303 A | 5/1992 | Desurvire et al. | |
| 5,202,780 A | 4/1993 | Fussanger | |
| 5,221,983 A | 6/1993 | Wagner | |
| 5,251,001 A | 10/1993 | Dave et al. | |
| 5,276,543 A | 1/1994 | Olshansky | |
| 5,307,366 A | 4/1994 | Auffret et al. | |
| 5,321,541 A | 6/1994 | Cohen | |
| 5,379,309 A | 1/1995 | Logan, Jr. | |
| 5,408,349 A | 4/1995 | Tsushima et al. | |
| 5,412,673 A | 5/1995 | Caprara et al. | |
| 5,434,662 A | 7/1995 | Rockwell et al. | |
| 5,436,760 A | 7/1995 | Nakabayashi | |
| 5,440,417 A | 8/1995 | Chung et al. | |
| 5,550,666 A | 8/1996 | Zirngibl | |
| 5,589,970 A | 12/1996 | Lyu et al. | |
| 5,606,555 A * | 2/1997 | Singer | 370/465 |
| 5,661,585 A | 8/1997 | Feldman et al. | |
| 5,694,234 A | 12/1997 | Darcie et al. | |
| 5,793,512 A | 8/1998 | Ryu | |
| 5,864,413 A * | 1/1999 | Feldman et al. | 398/72 |
| 5,880,865 A | 3/1999 | Lu et al. | |
| 5,894,247 A | 4/1999 | Yoshida et al. | |
| 5,907,417 A | 5/1999 | Darcie et al. | |
| 5,920,414 A | 7/1999 | Miyachi et al. | |
| RE36,471 E | 12/1999 | Cohen | |
| 6,034,799 A | 3/2000 | Hansen | |
| 6,097,523 A | 8/2000 | Boot | |
| 6,120,190 A | 9/2000 | Leard | |
| 6,137,611 A | 10/2000 | Boivin et al. | |
| 6,178,001 B1 | 1/2001 | Kim | |
| 6,304,350 B1 | 10/2001 | Doerr et al. | |
| 6,307,668 B1 | 10/2001 | Bastien et al. | |
| 6,323,994 B1 | 11/2001 | Li et al. | |
| 6,437,907 B1 | 8/2002 | Yoon et al. | |
| 6,600,760 B1 | 7/2003 | Green | |
| 6,650,840 B2 | 11/2003 | Feldman | |
| 6,654,401 B2 | 11/2003 | Cavalheiro Vieira et al. | |
| 6,674,969 B1 | 1/2004 | Ogusu | |
| 6,868,200 B2 | 3/2005 | Kimotsuki et al. | |
| 6,888,856 B2 | 5/2005 | Green et al. | |
| 7,106,974 B2 | 9/2006 | Lee et al. | |
| 7,327,957 B2 | 2/2008 | Lee et al. | |
| 7,349,631 B2 | 3/2008 | Lee et al. | |
| 7,593,647 B2 | 9/2009 | Lee et al. | |
| 2001/0004290 A1* | 6/2001 | Lee et al. | 359/124 |
| 2001/0013962 A1 | 8/2001 | Li | |
| 2001/0046364 A1 | 11/2001 | Ajima et al. | |
| 2002/0068859 A1 | 6/2002 | Knopp | |
| 2002/0071149 A1* | 6/2002 | Xu et al. | 359/110 |
| 2002/0126345 A1 | 9/2002 | Green | |
| 2002/0145775 A1 | 10/2002 | Effenberger et al. | |
| 2002/0196491 A1* | 12/2002 | Deng et al. | 359/124 |
| 2003/0076560 A1 | 4/2003 | Pratt et al. | |
| 2003/0095736 A1 | 5/2003 | Kish et al. | |
| 2003/0142978 A1 | 7/2003 | Lee et al. | |
| 2003/0206740 A1 | 11/2003 | Lee et al. | |
| 2004/0067059 A1 | 4/2004 | Song et al. | |
| 2004/0184805 A1 | 9/2004 | Shin et al. | |
| 2004/0202174 A1* | 10/2004 | Kim et al. | 370/395.1 |
| 2004/0208208 A1 | 10/2004 | Shin et al. | |
| 2005/0163503 A1 | 7/2005 | Lee et al. | |
| 2005/0286895 A1 | 12/2005 | Lee et al. | |
| 2006/0002706 A1 | 1/2006 | Lee et al. | |
| 2006/0263090 A1 | 11/2006 | Lee et al. | |
| 2007/0014509 A1 | 1/2007 | Kish, Jr. et al. | |
| 2007/0081823 A1 | 4/2007 | Lee et al. | |

FOREIGN PATENT DOCUMENTS

| | | |
|---|---|---|
| EP | 0607 029 A2 | 7/1994 |
| EP | 0844706 A2 | 5/1998 |
| EP | 0844706 A3 | 5/1998 |
| EP | 0991 217 A2 | 4/2000 |
| EP | 1 024 541 A2 | 8/2000 |
| EP | 1024 541 A | 8/2000 |
| EP | 1089 098 A1 | 4/2001 |
| EP | 1 024 541 A3 | 8/2001 |
| JP | 08-163097 | 6/1996 |
| KR | 00-33946 | 6/2000 |
| KR | 00-39036 | 7/2000 |
| KR | 1020010063062 | 7/2001 |
| KR | 10-0325687 B1 | 2/2002 |
| KR | 10-2003-0063085 A | 7/2003 |
| KR | 10-2003-0065632 A | 8/2003 |
| KR | 10-2003-0086223 A | 11/2003 |
| WO | WO 97/49248 A1 | 12/1997 |
| WO | WO 00/10271 | 2/2000 |
| WO | WO 03/032547 A2 | 4/2003 |
| WO | WO 03/063401 A2 | 7/2003 |
| WO | WO 03/065621 A1 | 8/2003 |
| WO | WO 03/107057 A1 | 12/2003 |
| WO | WO 2004/034621 A3 | 4/2004 |

OTHER PUBLICATIONS

Feldman, Robert D., et al.,"An Evaluation of Architectures Incorporating Wavelength Division Multiplexing for Broad-Band Fiber Access," Journal of Lightwave Technologies, vol. 16, No. 9, pp. 1546-1559. Sep. 1998.

Healey, P., et al. "Spectral Slicing WDM-PON Using Wavelength-Seeded Reflective SOAs", pp. 1181-1182 (Abstract only submitted herewith), Electronics Letters, published Sep. 13, 2001, vol. 37, Issue 19, ISSN: 0013-5194.

Jung, D.K., et al., "Wavelength-Division-Multiplexed Passive Optical Network Based on Spectrum-Slicing Techniques", Copyright 1998 IEEE, 1041-1135/98, IEEE Photonics Technology Letters, vol. 10, No. 9, Sep. 1998. pp. 1334-1336.

Lee, J.S., et al., "Spectrum-Sliced Fiber Amplifier Light Source for Multichannel WDM Applications", Copyright 1993 IEEE, pp. 1458-1461, IEEE Photonics Technology Letters, vol. 5, No. 12, Dec. 1993.

Mayweather, Derek, et al., "Wavelength Tracking of a Remote WDM Router in a Passive Optical Network," XP000624886, IEEE, Photonics Technology Letters, vol. 8, No. 9, Sep. 1996, 3 pages.

Petermann, Klaus, "Laser Diode Modulation and Noise," Section 7: Noise Characteristics of Solitary Laser Diodes, Section 7.3.2 Mode Partition Noise, pp. 163-166. PUblished by Springer, 1988 ISBN 9027726728, 9789027726728.

Pezeshki, B., et al., "12 Element Multi-Wavelength DFB Arrays for Widely Tunable Laser Modules," ThGG71 5:30 pm, Thursday afternoon/OFC 2002, pp. 711-712. Mar. 21, 2002.

Sampson, D.D., et al., "100 mW Spectrally-Uniform Broadband ASE Source for Spectrum-Sliced WDM Systems", Electronics Letters, IEE Stevenage, GB, vol. 30, No. 19, Sep. 15, 1994, pp. 1611-1612. XP006001052 ISSN: 0013-5194.

Petermann, Klaus, "Laser Diode Modulation and Noise," Section 7: Noise Characteristics of Solitary Laser Diodes, Section 7.3.2 Mode Partition Noise, Published by Springer, 1988 ISBN 9027726728, 9789027726728, pp. 163-166.

Kim, H. D. et al., "A Low-Cost WDM Source with an Ase Injected Fabry-Perot Semiconductor Laser," IEEE Photonics Technology Letters, IEEE Inc. New York, US, vol. 12, No. 8, pp. 1067-1069 (Aug. 2000).

J. Heanue et al., "Widely Tunable Laser Module using DFB Array and MEMS Selection with Internal Wavelength Locker", OFC 2003/ vol. 1, pp. 82-83.

Tae-Won Oh, et al., "Broadband Light Source for Wavelength-Division Multiple Access Passive Optical Network," Dept. of Electrical Engineering, Korea Advanced Institute of Science and Technology and Novera Optics Korea, Inc. (prior to Mar. 18, 2005).

International Search Report for PCT Counterpart Application No. PCT/KR2003/002812, 2 pgs. (Apr. 2, 2004).

* cited by examiner

OPTICAL ACCESS NETWORK USING WAVELENGTH-LOCKED WDM OPTICAL SOURCE INJECTED BY INCOHERENT LIGHT

CROSS-REFERENCE TO RELATED APPLICATION

This is a continuation application that claims benefit, under 35 USC §120, of co-pending International Application PCT/KR2003/002812, filed on 23 Dec. 2003, designating the United States, which claims foreign priority benefits under 35 USC §119 (a) to Korean Patent Application No. 10-2002-0083410, filed 24 Dec. 2002, which applications are incorporated herein by reference.

TECHNICAL FIELD

The present invention relates generally to a passive optical network and, more particularly, to a passive optical network that is capable of expanding the number of subscribers through wavelength sharing using Fabry-Perot laser diodes wavelength-locked by injected incoherent light.

BACKGROUND ART

As Recently, a variety of large-capacity optical transmission systems have been proposed to meet a rapidly increasing communication demand. Especially, for an access network that occupies the majority of an investment in data transmission network facilities, a low cost and high capacity optical transmission network must be introduced to lower investment costs as well as to meet a communication demand. To meet such requirements, optical access networks having various structures have been researched and reported.

To construct such a low cost optical transmission network, a passive optical transmission network, in which active devices are not included between subscribers and a central office and which includes only passive devices, must be considered. Furthermore, maintenance costs must be reduced by reducing the number of control elements in remote node located between the subscribers and the central office.

Korean Pat. No. 325687 filed by and issued to the present applicant discloses a light source for wavelength division multiplexing optical communication using a Fabry-Perot Laser Diode (FP-LD) wavelength-locked by injected incoherent light. In the Korean Pat. No. 325687, there is presented a light source, in which narrowband incoherent light is externally injected into a FP-LD so that some of the oscillation modes having wavelengths different from that of the injected light are suppressed and the output wavelength of the FP-LD is caused to be locked to a wavelength identical with that of the injected light.

In the FP-LD wavelength-locked by the injected incoherent light, the wavelengths of the light sources of an remote node demultiplexer and subscribers are automatically tuned to each other. Accordingly, the FP-LD wavelength-locked by the injected incoherent light is advantageous in that the temperature control of the devices is not required and sufficient power for the long-distance passive transmission of data is inexpensively achieved, unlike other light sources, so that a Wavelength Division Multiplexing (WDM) passive optical network using such a FP-LD can be inexpensively constructed.

Figure 1:
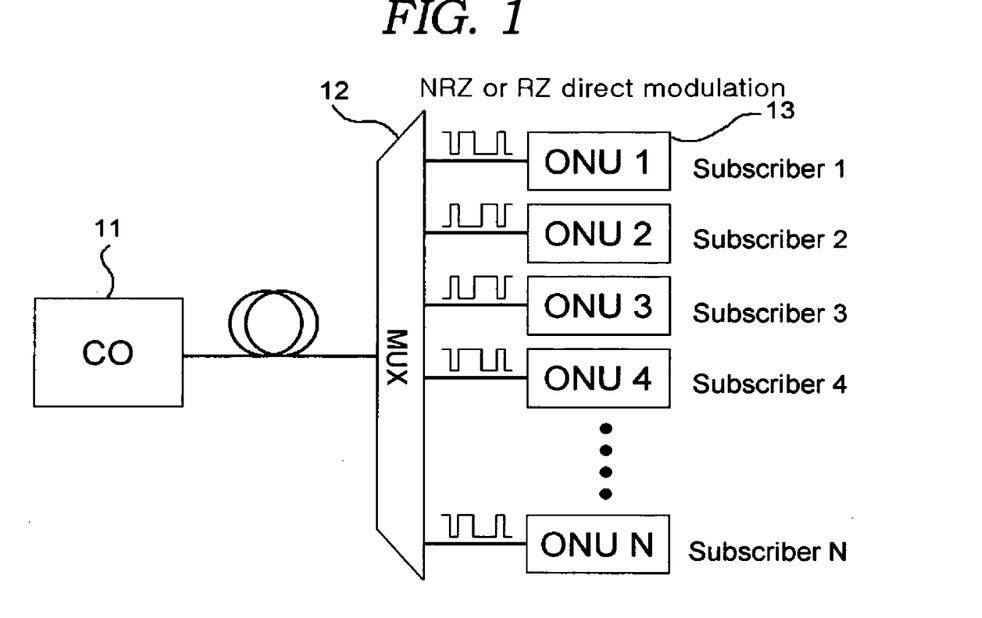
FIG. 1 is a configuration diagram of a general WDMA PON.

Generally, a WDM Passive Optical Network (PON) introduced to support large-capacity subscribers has a structure as shown in FIG. 1.

Each of the subscribers is connected to an Optical Network Unit (ONU) 13, possesses an optical transmission device having a unique wavelength, and sends a transmission signal, which is modulated to a Non Return-to-Zero (NRZ) digital signal, to a Multiplexer (MUX) 12. The MUX 12 multiplexes signals transmitted from the subscribers using WDM, and transmits a multiplexed signal to a Central Office (CO) 11 over a single optical fiber.

However, a WDM transmission system using a NRZ modulation method per channel generally allows a narrower bandwidth to be used to transmit data compared to the broadband characteristics thereof, so that it is problematic in that it has lower spectral efficiency. To solve the problem, there has been an attempt to improve the spectral efficiency by increasing a transmission rate per channel. However, the above-described method is not suitable for increasing the spectral efficiency in the general optical network because the general optical network has characteristics in which a low transmission rate in a low band and a large number of the channels are required, differently from a general back-bone network having a small number of channels and a high transmission rate. Accordingly, a Subcarrier Division Multiple Access (SCMA) that is capable of dealing with a larger number of subscribers by re-multiplexing each WDM optical channel using Time Division Multiplexing (TDM) or dividing each WDM optical channel using a plurality of Radio Frequency (RF) subcarriers is considered as an alternative to the above-described method.

Figure 2:
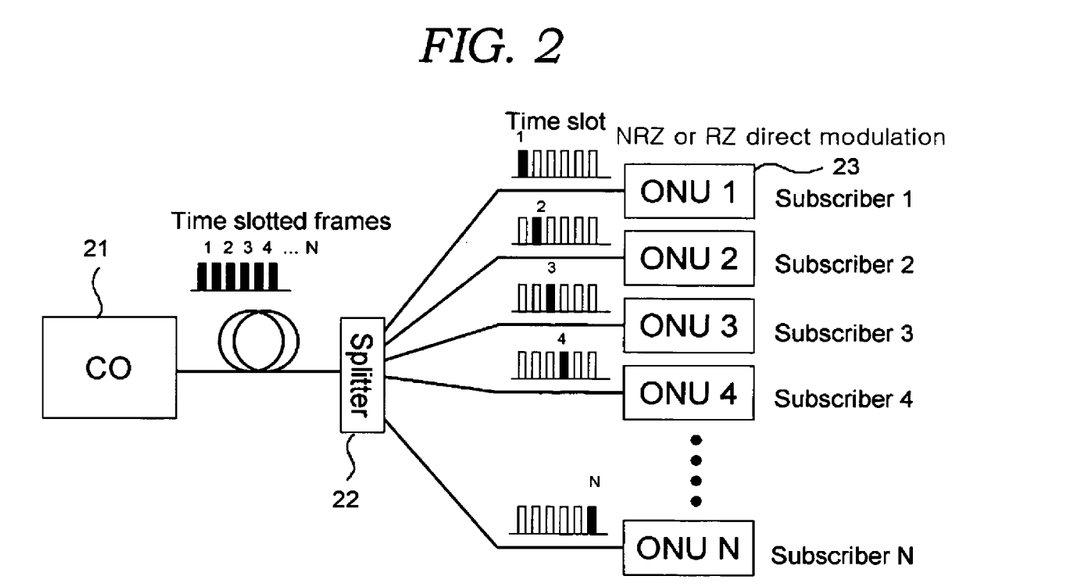
FIG. 2 is a configuration diagram of a general TDMA PON.
Figure 3:
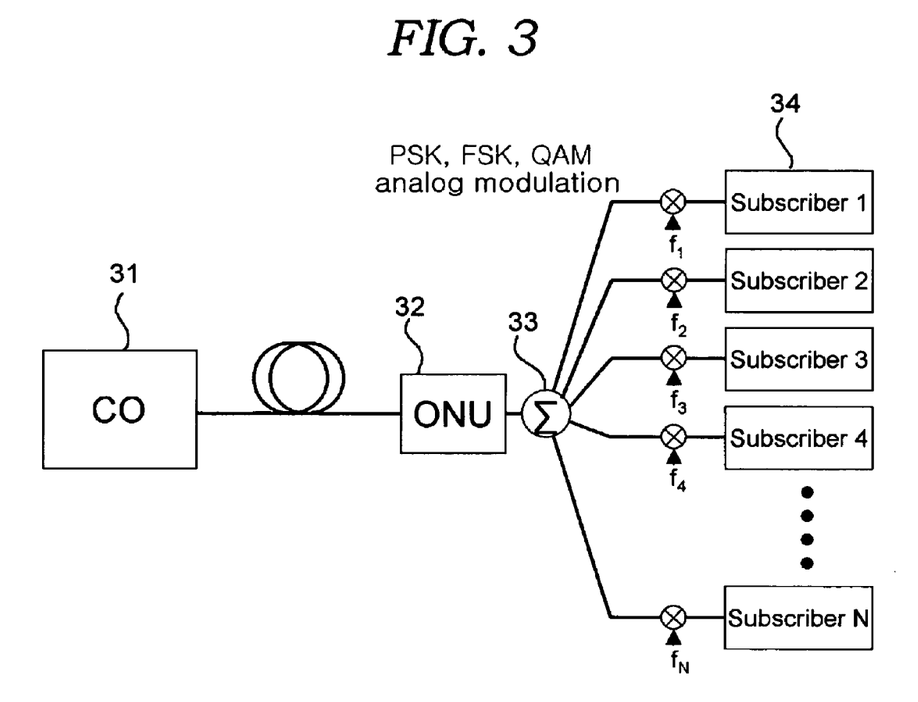
FIG. 3 is a configuration diagram of a general SCMA PON.

FIGS. 2 and 3 are configuration diagrams showing a general TDMA PON and an SCMA PON, respectively.

In FIG. 2, a CO 21 allocates time slots and transmits frames, and ONUs 23 receives the frames in the time slots allocated to themselves through a splitter 22.

Meanwhile, in FIG. 3, a CO 31 and an ONU 32 are connected to each other via a single optical fiber, and the ONU 32 is provided with a frequency combiner 33, so that the CO 31 communicates with each subscriber 34 through a subcarrier frequency.

Figure 4:
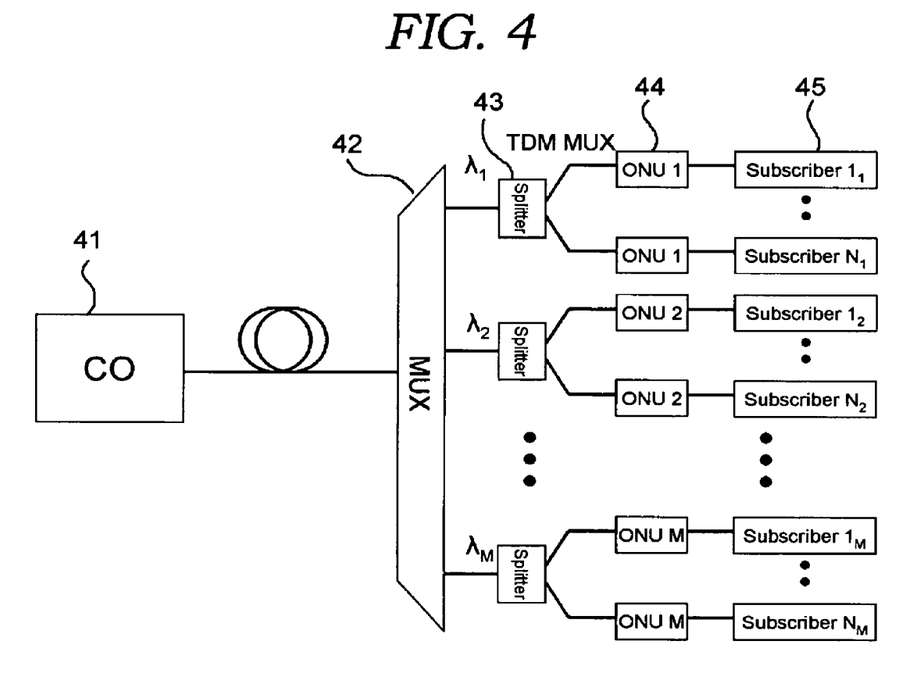
FIG. 4 is a configuration diagram of a general TDMA-WDM PON.
Figure 5:
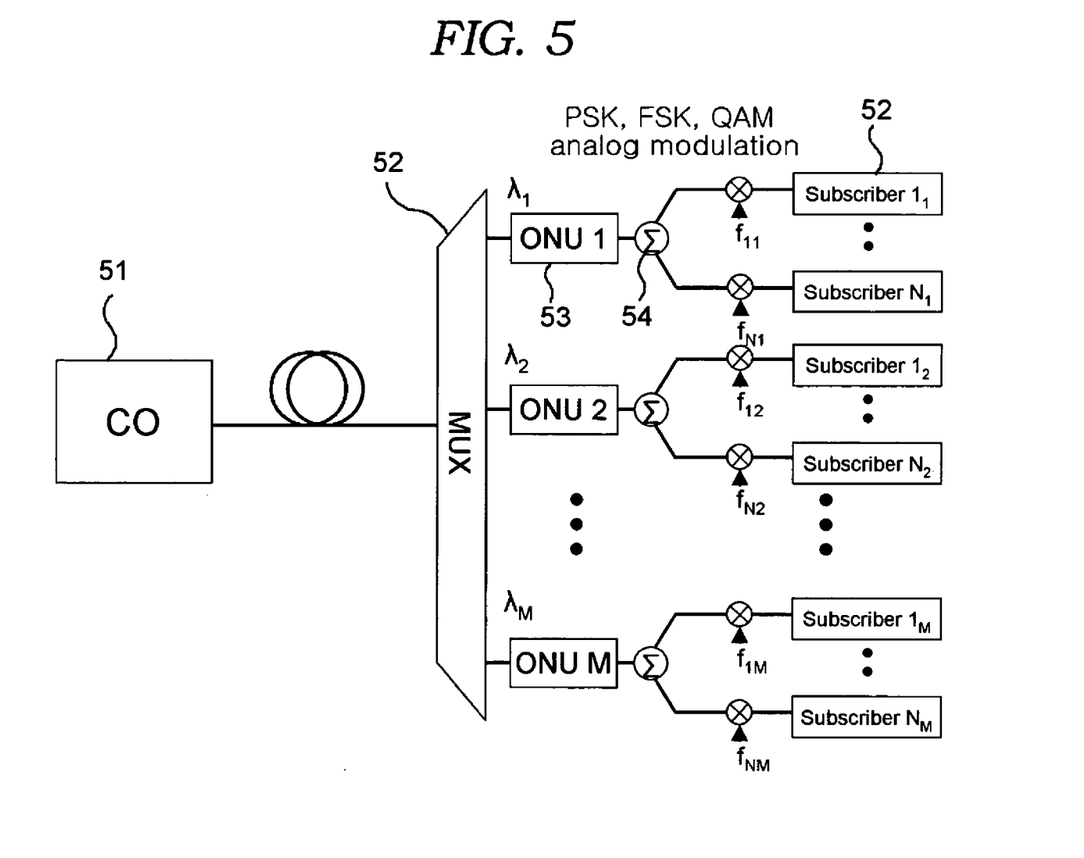
FIG. 5 is a configuration diagram of a general SCMA-WDM PON.

FIG. 4 is a configuration diagram of a combined TDMA and WDM PON, and FIG. 5 is configuration diagram of a combined SCMA and WDM PON.

In the PON of FIG. 4, a CO 41 is connected to a MUX 42 via a single optical fiber, and a splitter 43 is connected to each of the ports of the MUX 42. Additionally, the plural number of ONUs 44 are connected to the splitter 43. Accordingly, an optical signal transmitted from the CO 41 is divided according to wavelengths, and the splitter 43 divides the divided optical signal according to time slots and provides divided optical signals to the ONUs 44.

In FIG. 5, a CO 51 and a wavelength division MUX 52 are connected to each other via a single optical fiber, and an ONU 53 is connected to each of the ports of the MUX 52. An optical signal transmitted from the CO 51 is divided by the MUX 52, and the ONU 53 divides a divided optical signal according to frequencies through a combiner 54 and communicates with subscribers 55.

Figure 6:
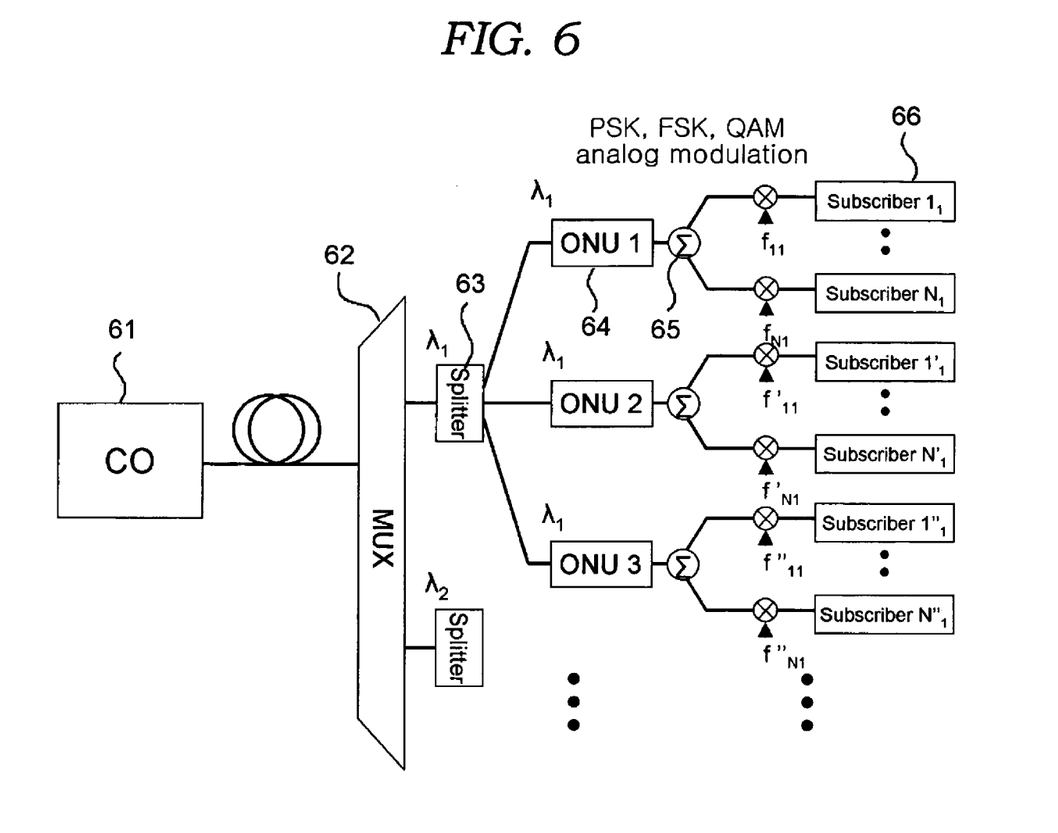
FIG. 6 is a configuration diagram of a SCMA PON in which wavelengths are shared using splitters connected to the ports of a MUX.

FIG. 6 is a configuration diagram of a PON in which the wavelength of light sources located at a subscriber is shared to increase the access efficiency of the SCMA-WDM access network.

Wavelengths divided by a MUX located between a CO 61 and subscribers 66 are shared using splitters 63 located next to the MUX 62. Lights modulated onto subcarriers carrying subscriber data are combined together in a single optical fiber in the splitters 63 used as a combiner, and wavelength groups are multiplexed using WDM, and transmitted to the CO 61. When the data is received, a Signal-to-Noise Ratio (SNR) is important when a wavelength is shared, the light shared in each of the wavelength groups interfere with each other, so that Optical Beat Interference (OBI) noise is generated. As a line width is narrowed and the centers of wavelengths coincide with each other, the OBI noise is increased, so that the OBI noise becomes dominant than the thermal noise or the shot noise. Meanwhile, the SNR of data received from the CO 61 is significantly influenced by the OBI noise. Accordingly, with a general Distributed Feedback Laser Diode (DFB-LD) or a FP-LD wavelength-locked by injected coherent light, it is difficult to construct an access network using the method of sharing a wavelength.

The TDMA-WDM PON of FIG. 4 and the SCMA-WDM PON of FIG. 6 have a common feature in that they share wavelengths. This wavelength sharing-type network may be considered to expand the number of subscribers. In this case, DFB-LDs, Light Emitting Diodes (LED) or FP-LDs can be used as light sources used at subscriber ends. The DFB-LDs have a high side mode suppression ratio and high output power. However, the DFD-LDs have a narrow line width, so that high OBI noise is generated in the wavelength sharing-type construction. Furthermore, manufacturing costs are relatively high, so that the high manufacturing costs act as a disadvantage in implementing a low cost access network. Accordingly, inexpensive diodes, such as the LEDs or the FP-LDs, have been used to construct the convectional PON in view of the manufacturing costs. However, the LEDs are disadvantageous in that the power budget design of an optical transmission link is seriously limited due to the low output power thereof, and the FP-LDs are disadvantageous in that transmission quality is degraded due to mode-partition noise generated by filtering.

To overcome these disadvantages, there has been proposed a technique of filtering the Amplified Spontaneous Emission (ASE) of an optical fiber amplifier in a spectral region and employing filtered ASE. The technique overcomes disadvantages, such as the low-power output of the LED or the mode-partition noise of the FP-LD, but still has the disadvantage of high manufacturing costs because a direct modulation is impossible.

DISCLOSURE OF THE INVENTION

Accordingly, the present invention has been made keeping in mind the above problems occurring in the prior art, and an object of the present invention is to provide a PON, which inexpensively improves the spectral efficiency of an access network and is capable of increasing the number of subscribers per channel by externally injecting broadband incoherent light, adopting a FP-LD as a light source and employing WDM in combination with TDM or SCMA, to extend a conventional WDM PON.

In order to accomplish the above object, the present invention provides a PON including light providing means provided in a CO to provide broadband incoherent light, a MUX connected to the CO via an optical fiber to divide the light transmitted from the light providing means according to wavelengths and to multiplex upstream signals, a plurality of splitters to branch divided lights and to combine the upstream optical signals, and a plurality of subscribers connected to the splitters, the subscribers including wavelength-locked FP-LDs capable of performing direct and analog modulation, and means for directly modulating lights of the FP-LDs and transmitting modulated lights to the subscribers using TDM.

The CO may modulate the downstream broadband incoherent light to a synchronization signal in order to provide the synchronization signal to the subscribers.

The distances from the splitters to the subscribers may be kept similar to minimize guard time to set up connection between the CO and the subscribers.

In order to accomplish the above object, the present invention provides a PON including light providing means provided in a CO to provide broadband incoherent light, a MUX connected to the CO via an optical fiber to divide the light transmitted from the light providing means according to wavelengths and to multiplex upstream signals, a plurality of splitters to branch divided lights and to join the upstream optical signals, and a plurality of subscribers connected to the splitters, the subscribers including wavelength-locked FP-LDs capable of performing direct and analog modulation, and means for directly modulating the FP-LDs using subcarrier modulation and transmitting the modulated lights to the subscribers.

The FP-LD is advantageous in that high output power is inexpensively provided and a direct modulation is enabled. However, the FP-LD has characteristics unsuitable for being used a light source for WDM optical transmission, such as the presence of a plurality of oscillation modes and the random variations of output power due to mode-hopping and mode-partition characteristics. To solve the above problems, when a light source 의 wavelength is close to specific oscillation mode is injected into the cavity of the FP-LD, the suppression ratio of side modes except for the specific oscillation mode is increased to 20 to 30 dB, so that an economical light source in which output is stabilized can be produced. In this case, coherent or incoherent light can be used as the injected light. The use of a broadband incoherent light, such as the ASE of an optical fiber amplifier, has an economical advantage in that the light can be injected into a plurality of light sources using a wavelength division multiplexer filter. Furthermore, the wavelength of the port of the wavelength division multiplexer and the output light generated from the FP-LD are automatically wavelength-locked, so that temperature control for stabilizing the wavelength is not needed, and thus manufacturing costs are reduced.

The present invention enables an inexpensive PON to be constructed using such wavelength-locked FP-LDs, and thus can provide a large-capacity PON in which sufficient output power is inexpensively achieved compared to other light sources, and the OBI noise is reduced due to the broad line width so that a plurality of subscribers can share a wavelength.

BEST MODE FOR CARRYING OUT THE INVENTION

Preferred embodiments according to the present invention are described in detail with reference to FIGS. 7 to 11 below.

Figure 7:
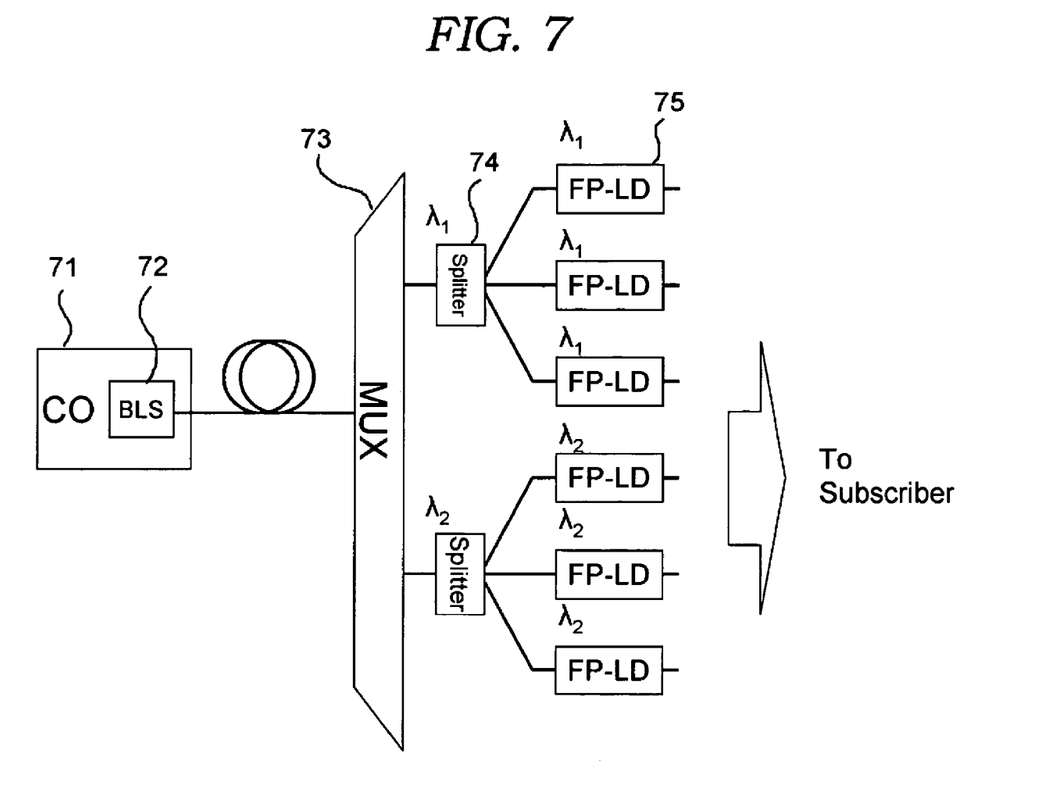
FIG. 7 is a configuration diagram of a wavelength sharing-type WDM PON using wavelength-locked FP-LDs according to the present invention.

FIG. 7 is a schematic diagram of a PON using wavelength-locked FP-LDs according to the present invention.

In the PON of the present invention, upstream signals from subscribers to a CO 71 are grouped according to the wavelength division ports of a MUX 73, and each of the ports is connected to the light sources of the subscribers that share a wavelength through a splitter 74. When the CO 71 transmits broadband incoherent light from a Broadband inherent Light Source (BLS) 72, the broadband inherent light is filtered according to wavelengths in the ports of the MUX 73, and then is injected into the grouped FP-LDs of the subscribers through the splitters 74. The externally injected broadband incoherent light determines the oscillation wavelength of the FP-LD, and the output power of the wavelength-locked FP-LD is used as the light source of the upstream signals from the subscribers. The output power of the wavelength-locked FP-LD is determined based on the bias current of the FP-LD and the intensity of the externally injected broadband incoherent light. When the oscillation-mode wavelength of the FP-LD and the central wavelength of the filtered BLS 72 close to each other and the intensity of the broadband inherent light is sufficient, a high side mode suppression ratio of 20 to 30 dB is exhibited, thus exhibiting the characteristics of near single wavelength light.

Meanwhile, an electric signal control unit (not shown) is included in the subscriber to modulate the FP-LD. The construction and operation of the electric signal control unit are well known, and a detailed description of them is omitted here.

Figure 8:
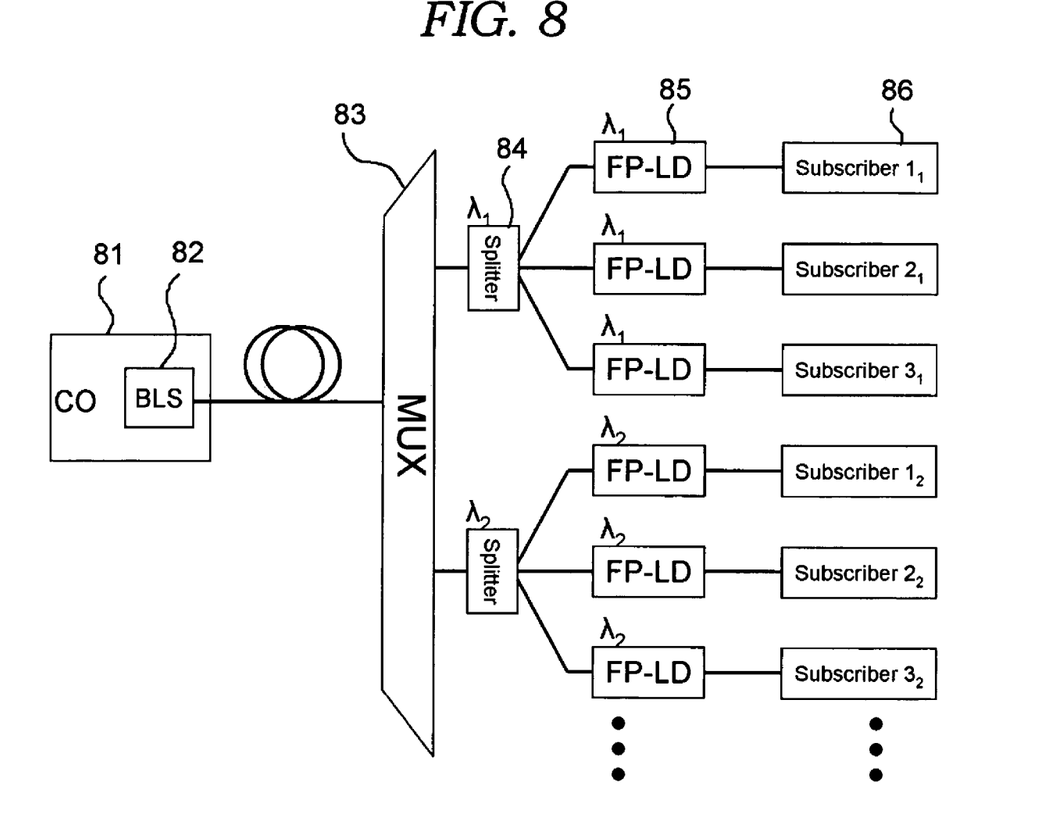
FIG. 8 is a configuration diagram of a wavelength sharing-type TDMA-WDM PON using wavelength-locked FP-LDs according to the present invention.

FIG. 8 is a schematic configuration diagram of a wavelength sharing-type TDMA-WDM PON using the basic construction of the present invention of FIG. 7.

In the PON of FIG. 8, the synchronization of time slots between the subscribers that share a wavelength is a principal issue. The guard time to set up connection between a CO 81 and the subscribers during time division multiplexing must be minimized by keeping the distances between a splitter 84 for multiplexing a wavelength using TDM and subscribers similar to each other, and a single clock signal used for synchronization must be transmitted to the subscribers. The keeping of the distances of optical fibers similar to each other can be easily implemented because the distance from the splitters 84 to the subscribers is relatively short, but it was difficult to synchronize all of the subscribers using a single clock. The wavelength sharing-type PON of the present invention externally modulates downstream broadband incoherent light to a synchronization signal and transmits the signal, so that it can be used as a synchronizing clock signal as well as light to lock the wavelength of the FP-LD. In this case, since the incoherent light is injected into the light source of each of the subscribers, the incoherent light must be modulated at a sufficiently low modulation index to prevent the output stabilization of the light source from being influenced.

Figure 9:
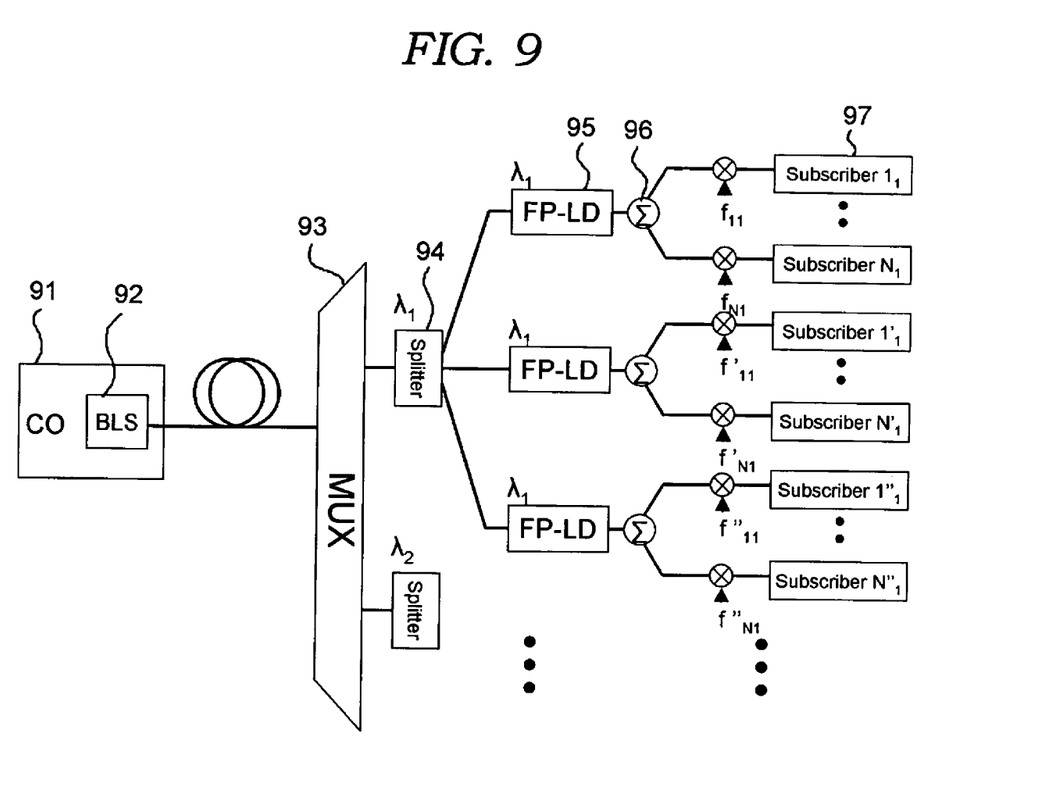
FIG. 9 is a configuration diagram of a wavelength sharing-type SCMA-WDM PON using wavelength-locked FP-LDs according to the present invention.

FIG. 9 is a schematic configuration of a wavelength sharing-type SCMA-WDM PON according to the present invention.

The SCMA-WDM PON is configured in such a way that subcarrier combiners are provided behind the FP-LDs of subscribers in the configuration of FIG. 7 to accommodate a large number of subscribers through a plurality of frequencies.

The SCMA wavelength sharing-type PON modulates upstream signals, which are transmitted from the subscribers, onto subcarriers of proper frequencies using Phase Shift Keying (PSK) or Quadrature Amplifier Modulation (QAM), and transmits modulated signals over an optical fiber. If the subcarriers are properly allocated to the subscribers, the SCMA wavelength sharing-type PON can accommodate a large number of subscribers compared to a TDMA PON, so that the PON having higher spectral efficiency can be constructed. In this case, if the plural numbers of the subscribers access an allocated single wavelength, OBI noise is generated. When the number of the subscribers is small, the OBI noise becomes considerably greater than shot noise and thermal noise. The amount of the OBI noise generated at this time is determined according to the line width of the light, the difference between the wavelengths of the lights causing OBI, and the number of the light sources that share a wavelength. Accordingly, the SNR degradation is determined by the signal bandwidth of the subcarrier. Generally, a Bit Error Rate (BER) representing the performance of a transmission system is determined by the SNR, so that, when the SNR required to achieve a desired BER is calculated, the maximum number of light sources that can share a single wavelength can be obtained. For example, when the transmission rate of data carried in a subcarrier is 155 Mbps and the data are modulated using FSK, the SNR needs to be 15.6 dB to satisfy $10^{-9}$ BER. If the wavelength difference between light sources is sufficiently small to be within 1 MHz, the filter bandwidth of injected ASE light is 100 GHz and the light sources have Gaussian filter characteristics, the maximum number of the light sources, which can share a wavelength, is limited to three. If a modulation method is changed to Quadrature Phase Shift Keying (QPSK), the SNR to achieve the same BER can be reduced, and a transmission symbol rate can be reduced, so that the number of the light sources, which can share a wavelength, can be increased.

Meanwhile, SNR degradation due to the OBI noise may be changed by the line width of the light source. In the case of the conventional FP-LD or DFB-LD, the line width thereof is narrow, so that the OBI noise is increased, and thus it is difficult to share the wavelength. The difficulty can be solved by an incoherent LED light source whose wavelength is divided and filtered, but the LED is not suitable for a long distance PON due to the low output thereof. Accordingly, the wavelength can be economically shared by not only achieving high output but also improving the OBI noise using a proper line width.

In a general PON, since the transmission of all the subscribers does not always occur, the number of FP-LD light sources, which may share the wavelength, can be statically calculated. When the number of the light sources, which can share the wavelength, is selected, SNR degradation due to the OBI must be taken into account. The costs of electrical signal processing are considerably inexpensive compared to the costs of an optical device, so that, if QPSK or QAM, which requires a low SNR compared to transmission rate, is used as a subcarrier modulation method, a large number of subscribers can be supported through wavelength sharing.

Figure 10:
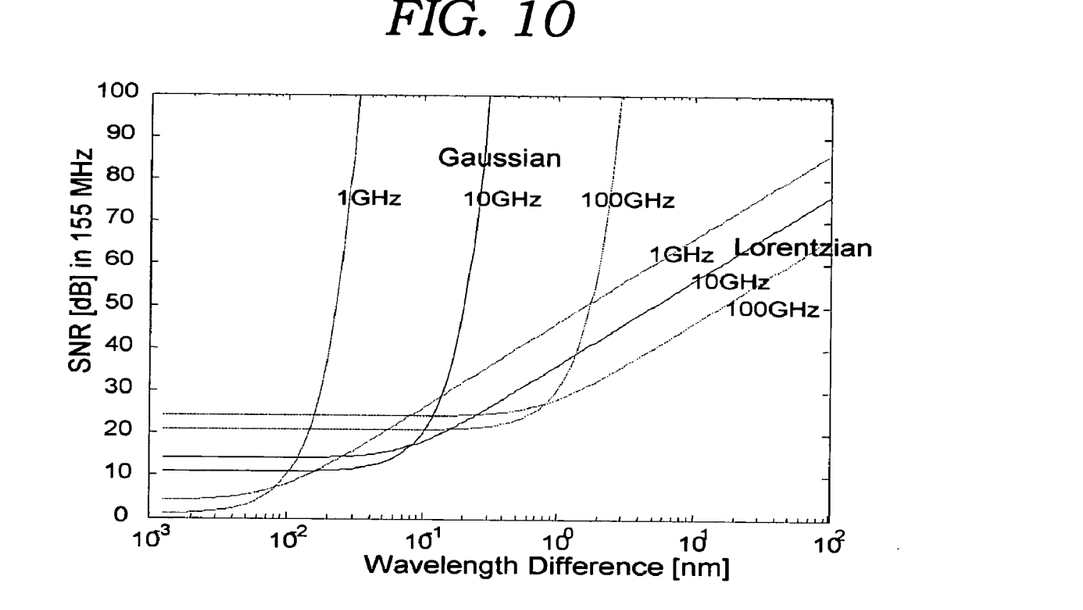
FIG. 10 is a graph showing SNR degradation due to OBI when two light sources share a wavelength according to the difference between the centers of wavelengths of two light sources.

FIG. 10 is a graph showing a SNR degradation according to the difference between the centers of wavelengths of two light sources when two couples of light sources having Gaussian and Lorentsian line shapes, respectively, each share a wavelength.

When the line width of the light is changed to 1 GHz, 10 GHz, and 100 GHz and the differences between the central wavelengths of the light sources coincide with each other, the worst SNRs of the light sources are obtained, and the worst SNRs are represented by Y-axis intercepts. When an Arrayed Waveguide Grating (AWG) generally arrayed in 200 GHz is used as a MUX, the filtered incoherent light of a port has a Gaussian line shape, and has a line width of about 100 GHz. Accordingly, on a curve corresponding to a line width of 100 GHZ, an SNR of about 21 dB is insured when there is no difference between the wavelengths of the light sources.

Figure 11:
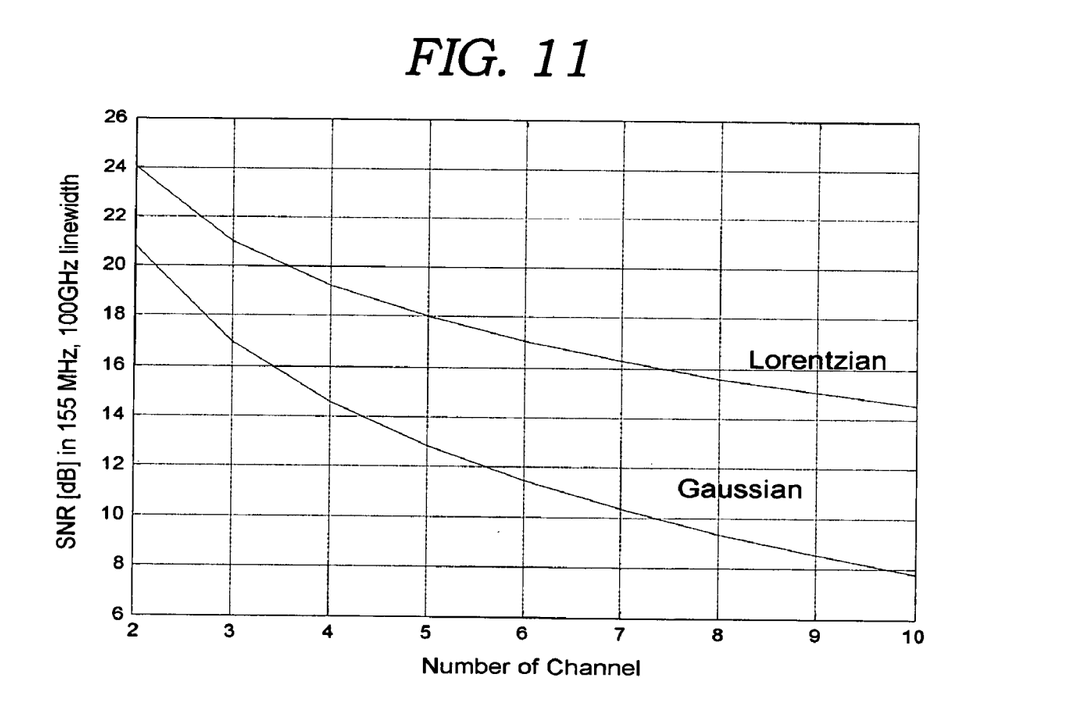
FIG. 11 is a graph showing the SNR degradation according to the number of the light sources that share a wavelength.

FIG. 11 is a graph showing SNR degradation according to the number of lights, which share a wavelength, when a MUX is used and a signal bandwidth is 155 MHz. In this case, it is assumed that there is no difference between the wavelengths of the light sources. Referring to a curve having a Gaussian line shape, when the number of the lights, which share the wavelength, are five, the SNR is 13 dB. If an FSK modulation method is used, an SNR of 15.6 dB is required to satisfy $10^{-9}$ BER. If a QPSK modulation method is used, a SNR of 12.6 dB is required to satisfy $10^{-9}$ BER. Accordingly, the number of the light sources, which share the wavelength, can be increased to five, that is, the number of the subscribers can be increased up to 60% compared to the FSK modulation method.

Furthermore, in a preferred embodiment, the number of optical subscribers can be increased in view of the maximum BER degradation when it is assumed that the subscribers, which are divided by optical splitters and share a single wavelength, generally do not use the wavelength at the same time. In this case, a statistical multiplexing gain is further increased, so that a more economical PON can be implemented. Substantially, a data or transport layer higher than a physical link layer takes charge of a function of detecting and correcting transmission errors or re-transmitting signals, so that an allowable BER is enough. In view of this point, it is expected that the number of the subscribers can be increased. In this case, the OBI noise can be minimized by minimizing the optical outputs of unused ONUs of the subscribers and thus reducing the number of the lights input from the subscribers with respect to a single wavelength.

Heretofore, a method of transmitting data from the subscribers to the CO has been described. In the case of transmitting the data from the CO to the subscribers, the CO communicates with the subscribers using the same method. Additionally, in this case, a method of bi-directionally transmitting signal over a single optical fiber to save optical fibers can be used, or upstream signals and downstream signals using two optical fibers can be separated using two optical fibers. In the case of selecting the bi-directional transmission over a single optical fiber, the upstream signals and the downstream signals can be transmitted in the state of being separated in proper spectral regions, or can be separated using a bi-directional non-reciprocal filter per channel. Meanwhile, there is another method in which the upstream signals are transmitted using wavelength-locked light sources as described above, and downstream signals multiplexed using TDM are transmitted via broadcast to all the subscribers. Furthermore, a bi-directional transmission system located between the CO and the subscribers can be implemented by combining the above-described methods.

Although the present invention has been described based on the preferred embodiments, these embodiments are not intended to illustrate the present invention. It will be apparent to those skilled in the art that various variations, modifications, and adjustments are possible without departing from the scope and spirit of the invention. The scope of the present invention is limited only by the accompanying claims. It should be appreciated that the scope of the present invention includes the variations, modifications and adjustments.

INDUSTRIAL APPLICABILITY

As described above, the present invention replaces a conventional light source, which significantly influences the increase of manufacturing costs and transmission performance, with a wavelength-locked FP-LD so that the manufacturing costs are reduced. The present invention uses WDMA in combination with TDMA or SCMA to increase the spectral efficiency of a WDM PON so that wavelengths can be shared and the transmission capacity of the PON can be considerably increased. That is, the present invention uses the FP-LDs injected with incoherent light as light sources, so that high output power can be achieved, direct modulation can be performed, and the locking of wavelengths between the wavelength-division MUX and the light sources is automatically performed, thus reducing costs required for the control of the locking. Furthermore, the light sources have broad linewidth according to the characteristics thereof, so that OBI noise due to wavelength sharing can be reduced. Accordingly, a large number of subscribers are accommodated compared to the case where wavelengths are shared by conventional light sources, so that an economical PON can be constructed.

The invention claimed is:

1. A passive optical network, comprising:
a broadband light source in a central office to provide broadband incoherent light;
a multiplexer connected to the central office via an optical fiber for filtering the light transmitted from the broadband light source according to wavelengths and multiplexing upstream signals to provide a first plurality of wavelengths;
at least one splitter coupled to the multiplexer for branching a wavelength of the first plurality of wavelengths and combining the upstream optical signals; and
a plurality of wavelength-locked Fabry-Perot laser diodes connected to the at least one splitter to share the branched wavelength that is injected through the splitter to determine an oscillation wavelength of the plurality of wavelength-locked Fabry-Perot laser diodes, the wavelength-locked Fabry-Perot laser diodes capable of performing direct and analog modulation, and a control unit to directly modulate lights of the Fabry-Perot laser diodes and transmitting modulated lights to subscribers using time division multiplexing.

2. The passive optical network of claim 1, wherein the central office modulates the downstream broadband incoherent light to a synchronization signal, and provides the synchronization signal to the subscribers as a reference clock.

3. The passive optical network of claim 2, wherein distances from the at least one splitter to the subscribers are kept similar to minimize guard time to set up connection between the central office and the subscribers.

4. The passive optical network of claim 1, wherein the central office and the multiplexer are connected via a single optical fiber so that bi-directional transmission is enabled.

5. A passive optical network, comprising:
a broadband light source in a central office to provide broadband incoherent light;
a multiplexer connected to the central office via an optical fiber for dividing the light transmitted from the broadband light source according to wavelengths to provide a first plurality of lights and to multiplexing upstream signals;
at least one splitter coupled to the multiplexer for branching a wavelength of the first plurality of lights and combining the upstream optical signals; and
a plurality of wavelength-locked Fabry-Perot laser diodes connected to the at least one splitter to share the branched wavelength that injected through the splitter to determine an oscillation wavelength of the plurality of wavelength-locked Fabry-Perot laser diodes, the wavelength-locked Fabry-Perot laser diodes capable of performing direct and analog modulation, and a control unit to directly modulate the Fabry-Perot laser diodes using subcarrier modulation and transmitting the modulated lights to subscribers.

6. The passive optical network of claim 5, wherein the subcarrier modulation is one of a Frequency Shift Keying (FSK), Phase Shift Keying (PSK) and Quadrature Amplifier Modulation (QAM).

7. The passive optical network of claim 5, wherein, when one or more of the subscribers do not transmit data, the light providing means lowers power of the light and thus reducing optical Beat Interference Noise (OBI), so that a number of subscribers are statically increased.

8. The passive optical network of claim 5, wherein the central office and the multiplexer are connected via a single optical fiber so that bi-directional transmission is enabled.

9. A method, comprising:
supplying broadband light;
filtering the broadband light transmitted according to wavelengths to provide a first plurality of wavelengths;
injecting, through the splitter, a filtered wavelength of the first plurality of wavelengths into a plurality of wavelength-locked Fabry-Perot laser diodes, to provide output lights, so that the injected wavelength that is shared between the plurality of wavelength-locked Fabry-Perot laser diodes through the splitter determines an oscillation wavelength of the plurality of wavelength-locked Fabry-Perot laser diodes; and
modulating the output lights of the Fabry-Perot laser diodes.

10. The method of claim 9, further comprising
multiplexing upstream signals; and
combining the upstream signals.

11. The method of claim 9, further comprising
transmitting the modulated output lights by time division multiplexing.

12. The method of claim 9, wherein the output lights are modulated using subcarrier modulation.

13. The method of claim 9, further comprising
modulating the broadband light to provide a synchronization signal as a reference clock.

14. An apparatus, comprising:
a broadband light source to provide broadband light;
a multiplexer for filtering broadband light according to wavelengths to provide a first plurality of wavelengths;
a splitter coupled to the multiplexer to branch a wavelength of the first plurality of wavelengths; and
a plurality of wavelength-locked Fabry-Perot laser diodes connected to the splitter to share the branched wavelength that is injected through the splitter to determine an oscillation wavelength of the plurality of wavelength-locked Fabry-Perot laser diodes.

15. The apparatus of claim 14, wherein the broadband light is modulated.

16. The apparatus of claim 14, further comprising
a control unit to modulate lights of the Fabry-Perot laser diodes.

17. The apparatus of claim 16, wherein the modulated output lights are transmitted from the Fabry-Perot laser diodes by time division multiplexing.

18. The method of claim 16, wherein the modulated output lights are transmitted from the Fabry-Perot laser diodes by subcarrier modulation.

19. A system, comprising:
means for supplying broadband light;
means for filtering the broadband light according to wavelengths to provide a first plurality of wavelengths;
means for injecting, through the splitter, a filtered wavelength of the first plurality of wavelengths into a plurality of wavelength-locked Fabry-Perot laser diodes to provide output lights, so that the injected wavelength that is shared between the plurality of wavelength-locked Fabry-Perot laser diodes through the splitter determines an oscillation wavelength of the output lights; and
means for modulating the output lights of the Fabry-Perot laser diodes.

20. The system of claim 19, further comprising
means for modulating the broadband light.

* * * * *